US011720866B1

(12) United States Patent
Hayes

(10) Patent No.: US 11,720,866 B1
(45) Date of Patent: Aug. 8, 2023

(54) TRANSFERRING FUNDS BETWEEN TWO PARTIES

(71) Applicant: Wells Fargo Bank, N.A., San Francisco, CA (US)

(72) Inventor: Thomas B. Hayes, Katy, TX (US)

(73) Assignee: Wells Fargo Bank, N.A., San Francisco, CA (US)

(*) Notice: Subject to any disclaimer, the term of this patent is extended or adjusted under 35 U.S.C. 154(b) by 65 days.

(21) Appl. No.: 17/215,184

(22) Filed: Mar. 29, 2021

Related U.S. Application Data

(62) Division of application No. 15/141,537, filed on Apr. 28, 2016, now Pat. No. 10,990,935.

(51) Int. Cl.
  *G06Q 20/10* (2012.01)
  *H04L 67/104* (2022.01)
  *G06Q 20/28* (2012.01)
  *H04L 67/146* (2022.01)

(52) U.S. Cl.
  CPC ............ *G06Q 20/10* (2013.01); *G06Q 20/28* (2013.01); *H04L 67/104* (2013.01); *H04L 67/146* (2013.01)

(58) Field of Classification Search
  CPC .. G06Q 40/04; G06Q 20/0655; G06Q 20/381; G06Q 50/188; G06Q 20/10; G06Q 20/28; G06F 3/0482; H04L 67/104; H04L 67/146
  See application file for complete search history.

(56) References Cited

U.S. PATENT DOCUMENTS 7,204,412 B2 * 4/2007 Foss, Jr. ................ G06Q 40/02
                                                705/64
8,249,985 B2    8/2012 Giordano et al.
(Continued)

FOREIGN PATENT DOCUMENTS

CA     2360765    *  5/2001  ............ G06Q 20/10
EP     3341886 A1 *  7/2018  ............ G06F 21/10
(Continued)

OTHER PUBLICATIONS

AuthO: Understanding Refreh Tokens, 2013-2016, p. 1 (Year: 2013).*
(Continued)

*Primary Examiner* — Bijendra K Shrestha
(74) *Attorney, Agent, or Firm* — Merchant & Gould P.C.

(57) ABSTRACT

A method for transferring funds to a second electronic computing device includes establishing a first pre-paid payment account on a first electronic computing device. The first pre-paid payment account is used to establish one or more second pre-paid payment accounts. The one or more second pre-paid payment accounts have a value that is less than or equal to the first pre-paid payment account. A first account identifier is obtained for one of the second pre-paid payment accounts. The first account identifier is sent to the second electronic computing device. The sending of the first account identifier to the second electronic computing device results in a transfer of ownership of the one more second pre-paid accounts from a first user at the first electronic computing device to a second user at the second electronic computing device.

18 Claims, 9 Drawing Sheets

(56) References Cited

U.S. PATENT DOCUMENTS

| | | | | |
|---|---|---|---|---|
| 8,825,008 B2* | 9/2014 | Hoover | ................. | H04W 12/35 455/406 |
| 10,104,163 B1* | 10/2018 | Stickle | ................... | G06F 21/10 |
| 2003/0143979 A1* | 7/2003 | Suzuki | ................. | H04L 67/306 455/406 |
| 2007/0255653 A1* | 11/2007 | Tumminaro | ....... | G06Q 20/3255 705/39 |
| 2009/0136016 A1* | 5/2009 | Gornoi | ................... | H04L 12/66 379/212.01 |
| 2010/0017413 A1* | 1/2010 | James | ................. | G06Q 20/385 707/E17.032 |
| 2011/0218907 A1* | 9/2011 | Dessert | ................. | G06Q 30/02 705/39 |
| 2013/0165072 A1 | 6/2013 | Hoover et al. | | |
| 2013/0238372 A1* | 9/2013 | Jordan | ................... | G07B 15/00 705/5 |
| 2014/0108249 A1* | 4/2014 | Kulpati | ................. | G06Q 20/16 705/44 |
| 2014/0129451 A1* | 5/2014 | Carlson | ................. | G06Q 20/40 705/44 |
| 2014/0156435 A1* | 6/2014 | Rahman | ............... | G06Q 20/385 705/44 |
| 2014/0337206 A1* | 11/2014 | Talker | ................ | G06Q 20/0658 705/41 |
| 2015/0058202 A1* | 2/2015 | Dahaeck | ................ | G06F 21/10 726/28 |
| 2017/0262819 A1 | 9/2017 | Malhotra et al. | | |

FOREIGN PATENT DOCUMENTS

| | | | | |
|---|---|---|---|---|
| WO | | 2014025738 A1 | 2/2014 | |
| WO | WO-2014025738 A1 * | | 2/2014 | ........... G06Q 20/065 |

OTHER PUBLICATIONS

AuthO: Understanding Refresh Tokens, 2013-2016, p. 1 (Year: 2013).*
PYMNTS: Banking the Unbanked using Prepaid Platforms and Mobile Telephones in the U.S., Dec. 3, 2009, pp. 1-31. (Year: 2009).*
Merrit, Cynthia: Mobile Money Transfer Services: The Next Phase in the Evolution in Person-to-Person Payments, Aug. 2010, Retail Payment Risk Forum White Paper, Fedrral Reserve Bank of Atlanta, pp. 1-32. (Year: 2010).*
CanadianWireless: How to change ownership of my mobile phone, Aug. 4, 2013, pp. 1-2 (Year: 2013).*

* cited by examiner

400 ⬊

402 ⬊
```
Account ID 1

143112 : 8431718
   |          |
 Token  Transfer Code
```

404 ⬊
```
Account ID 2

143112 : 8431740
   |          |
 Token  Transfer Code
```

FIG. 4

TRANSFERRING FUNDS BETWEEN TWO PARTIES

BACKGROUND

Mobile electronic computing devices such as smart phones commonly include functionality that permits users to conduct electronic transactions. For example, users can purchase products over the Internet using the smart phones. Users can also conduct transactions at a financial institution such as checking account balances and transferring funds from one account to another.

Some mobile electronic computing devices permit users to electronically transfer funds from an electronic computing device of one user to an electronic computing device of another user. Typically, the funds can be electronically transferred from a financial account of the one user to a financial account of the other user.

SUMMARY

Embodiments of the disclosure are directed to a method implemented on an electronic computing device for transferring funds to a second electronic computing device, the method comprising: on the first electronic computing device, establishing a first pre-paid payment account; using the first pre-paid payment account to establish one or more second pre-paid payment accounts, the one or more second pre-paid payment accounts having a value that is less than or equal to the first pre-paid payment account; obtaining a first account identifier for one of the one or more second pre-paid payment accounts; and sending the first account identifier to the second electronic computing device, wherein the sending of the first account identifier to the second electronic computing device results in a transfer of ownership of the one more second pre-paid accounts from a first user at the first electronic computing device to a second user at the second electronic computing device.

In another aspect, a method implemented on a first electronic computing device for receiving ownership of a monetary amount from a second electronic computing device comprises: on the first electronic computing device, receiving a first account identifier from the second electronic computing device, the first account identifier being an identifier for a financial account from which funds having a value equal to the monetary amount can be obtained; sending the first account identifier to a server computer that has access to the financial account; and receiving a second account identifier from the server computer, the second account identifier being different than the first account identifier, the second account identifier confirming a transfer of the ownership of the monetary amount to a first user of the first electronic computing device.

In yet another aspect, an electronic computing device includes a processing unit; and system memory, the system memory including instructions which, when executed by the processing unit, cause the electronic computing device to: establish a first pre-paid payment account; use the first pre-paid payment account to establish one or more second pre-paid payment accounts, the one or more second pre-paid payment accounts having a value less than or equal to the first pre-paid payment account; obtain from a server computer at a financial institution, a first account identifier for one of the one or more second pre-paid payment accounts, the one of the one or more second pre-paid payment accounts having a first dollar amount, the first account identifier comprising a token and a first transfer code; establish a peer-to-peer connection with a second electronic computing device; use the peer-to-peer connection to send the first account identifier to the second electronic computing device; use the peer-to-peer connection to send to the second electronic computing device a uniform resource locator (URL) of the server computer at the financial institution, wherein after the first account identifier and the URL of the server computer are sent to the second electronic computing device, ownership of the one or more second pre-paid accounts is transferred from a first user at the first electronic computing device to a second user at the second electronic computing device.

The details of one or more techniques are set forth in the accompanying drawings and the description below. Other features, objects, and advantages of these techniques will be apparent from the description, drawings, and claims.

DESCRIPTION OF THE DRAWINGS

FIG. 4 shows example structures of account identifiers for the prepaid accounts of the user devices of the system of FIG. 1.

DETAILED DESCRIPTION

Figure 1:
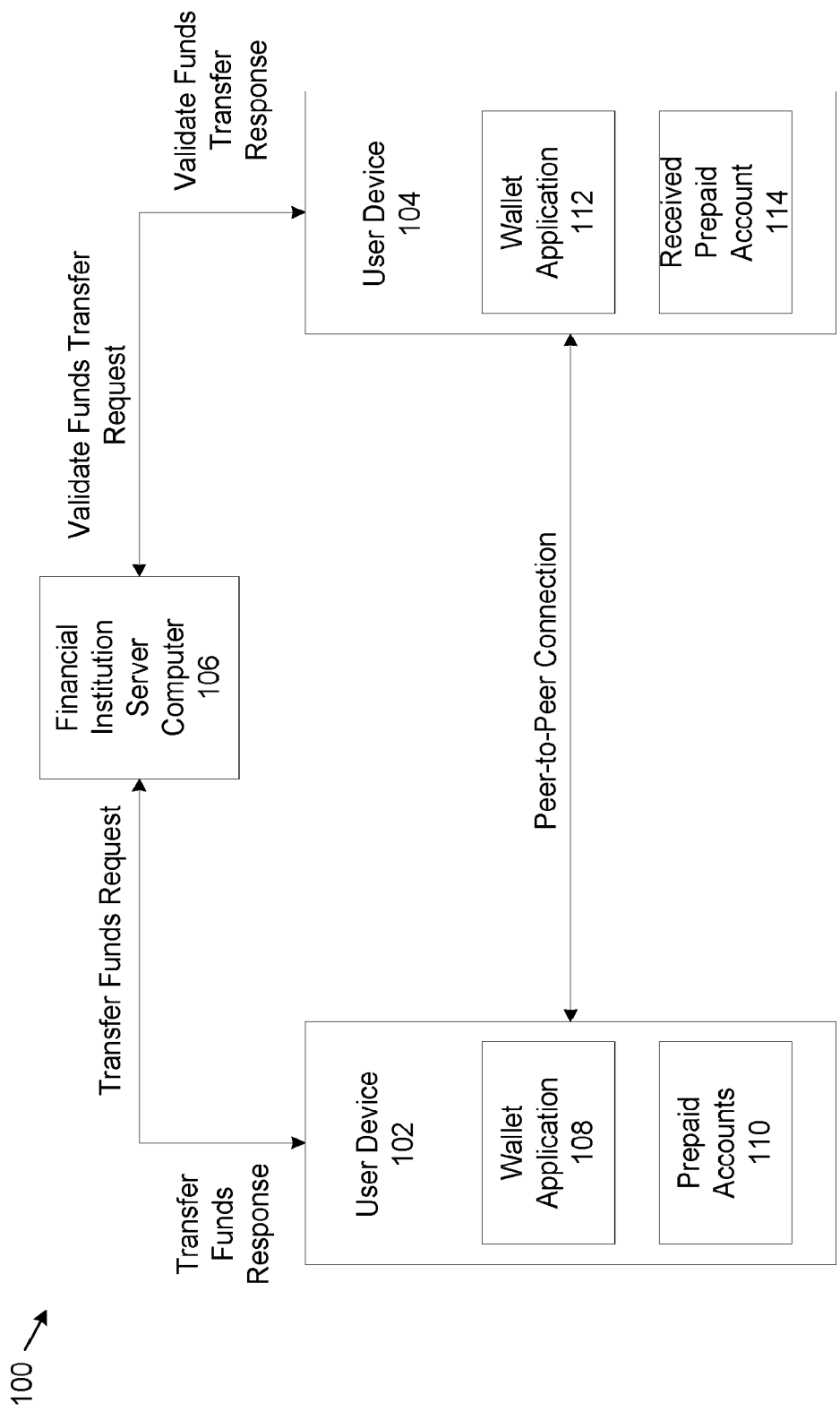
FIG. 1 shows an example system that supports transferring funds peer-to-peer between two parties.

The present disclosure is directed to systems and methods that facilitate transferring of funds from a mobile electronic computing device of one user to a mobile electronic computing device of another user without requiring the user transferring the funds to have access to a financial account of the user receiving the funds. In addition, once the funds are transferred, the user receiving the funds has control over the funds and the user who transferred the funds no longer has access to the funds.

In an example implementation, the user transferring the funds obtains a prepaid account for the amount of the funds. The prepaid account includes an account identification number. The user transferring the funds then establishes a connection between the mobile electronic computing device of the user transferring the funds and the mobile electronic computing device of the user receiving the funds. In this example implementation, the connection is a peer-to-peer connection such as Bluetooth. However, in other implementations the connection can be made over a network, such as the Internet. The identification number of the prepaid account is transferred using the connection from the user device of the user transferring the funds to the user device of the user receiving the funds.

When the identification number is received at the user device of the user receiving the funds, the user device of the user receiving the funds sends the identification number to a server computer of a financial institution in which the user transferring the funds has an account. When the identification number is received at the server computer, the server computer transfers ownership of the funds to the user of the user device receiving the funds. The server computer creates an updated identification number and sends the updated identification number to the user device of the user receiving the funds.

Once the user device receiving the funds has the updated identification number, the user of the user device receiving the funds can use a wallet application on the user device of the user receiving the funds to make purchases for an amount equal or less to the amount of the funds. In addition, once the server computer issues the updated identification number, the user transferring the funds no longer has control over the funds and cannot issue a stop order on the funds. The funds are in the possession and control of the user receiving the funds.

In these examples, no actual funds are transferred when the user sending the funds sends the identification number to the user receiving the funds. The funds are actually transferred at the server computer to a prepaid account that is in the possession of the user receiving the funds. When the user receiving the funds makes a purchase using the wallet application, any amount of the purchase equal to or less than the amount of the funds is deducted from the prepaid account that is in the possession of the user receiving the funds.

The systems and methods disclosed herein are directed to a computer technology that can provide a direct transfer of funds from one user device to another user device without requiring access to a financial account of the user device receiving the funds. Efficiencies can be created because the server computer only needs to interface with a financial account of the user transferring the funds and does not need to maintain financial accounts for a plurality of users that may be receiving funds.

FIG. 1 shows an example system 100 that supports transferring funds peer-to-peer between two parties. System 100 includes a user device 102, a user device 104 and a financial institution server computer 106. User device 102 includes a wallet application 108 and prepaid accounts 110. User device 104 includes a wallet application 112 and a received prepaid account 114.

The example user device 102 is a mobile electronics device such as a smartphone or tablet computer. In an example implementation of system 100, a user of user device 102 can have one or more financial accounts at a financial institution associated with financial institution server computer 106. The user can access one or more of the financial accounts, obtain funds from the one or more financial accounts and establish one or more prepaid accounts 110 on user device 102. For example, the user can withdraw $500 from the one or more financial accounts and establish a $500 primary prepaid account 110 on user device 102. As discussed later herein, the user of user device 102 can establish one or more secondary prepaid accounts and transfer all or part of the $500 to one or more other users.

The example user device 104 is also a mobile device such as a smartphone or tablet computer. In the example implementation of system 100, all or part of the $500 from prepaid accounts 110 can be transferred to the received prepaid account 114 on user device 104.

The example financial institution server computer 106 is a server computer at a financial institution such as a bank. The financial institution server computer 106 can provide access to the one more financial accounts of the user of user device 102. In addition, as described in detail later herein, the financial institution server computer 106 can facilitate a transfer of funds between user device 102 and user device 104.

The example wallet application 108 and wallet application 112 provide digital wallet functionality to users of user device 102 and user device 104, respectively. For example, wallet application 108 permits items to be purchased via electronic transactions up to a dollar amount of prepaid accounts 110. In one example implementation, once funds are transferred to received prepaid account 114, wallet application 112 permits items to be purchased up to a dollar amount of received prepaid account 114. In another implementation, the wallet application 112 can supply account data to a point of sale device and a backend system can determine if the prepaid account 114 is funded enough to make a specific purchase.

As discussed in more detail later herein, a peer-to-peer connection can be used to transfer account identification information between user device 102 and user device 104. As discussed in more detail later herein, the account identification information can comprise a token and a transfer code. The token is a number that can identify a transfer of a secondary prepaid account from user device 102 to user device 104. The transfer code is a number that can identify an ownership of the secondary prepaid account. A first transfer code can identify that user device 102 has ownership of the secondary prepaid account and a second transfer code can identify that user device 104 has ownership of the secondary prepaid account.

In the example implementation shown in FIG. 1, when the user at user device 102 wants to transfer funds from prepaid accounts 110 to user device 104, user device 102 sends a transfer funds request to financial institution server computer 106. The transfer funds request includes an amount to be transferred. Financial institution server computer 106 creates a secondary prepaid account for the amount to be transferred and creates a first account ID for the secondary prepaid account. Financial institution server computer 106 then sends a transfer funds response to user device 102. The transfer funds response includes the first account ID to be used during the transfer. The first account ID includes the token and the first transfer code.

In one implementation, the first account ID and a uniform resource locator (URL) of the financial institution server computer 106 are sent to user device 104 via the peer-to-peer connection. In another implementation, user device 104 may already have pre-existing knowledge of the URL, in which case the URL would not need to be sent again. User device 104 then sends a validate funds transfer request to financial institution server computer 106. The validate funds transfer request includes the first account ID and can also include the amount to be transferred to user device 104. After financial institution server computer 106 validates the transfer request, financial institution server computer 106 sends a validate funds transfer response to user device 104. The validate funds transfer response includes a second account ID. The second account ID comprises the token and the second transfer code. The second transfer code is different than the first transfer code. The validate transfer response indicates that the financial institution server computer has deducted the amount of the funds to be transferred from the financial account of the user of user device 102. The amount of the funds to be transferred is now stored in received prepaid account 114 and available to the user of user device 104 to make purchases via electronic transactions. The validate transfer response also indicates that the funds are no longer available to the user of user device 102.

In some implementations, after financial institution server computer 106 validates the funds transfer request, financial institution server computer 106 can send a message to user device 102 informing user device 102 the funds transfer has been completed. When user device 102 receives the message from financial services institution server computer 106, user device 102 can delete the secondary prepaid account from user device 102.

Figure 2:
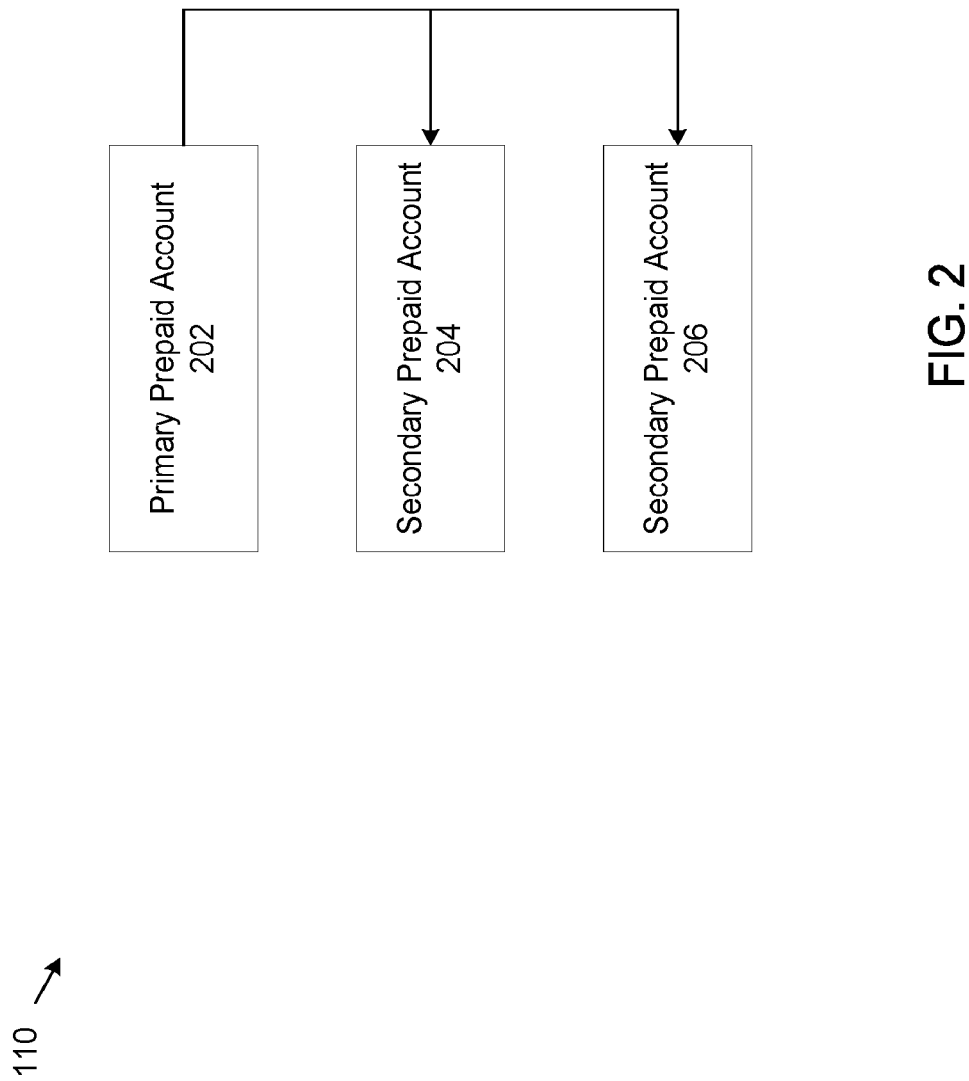
FIG. 2 shows example primary and secondary prepaid accounts of a user device of the system of FIG. 1.

FIG. 2 shows example primary and secondary prepaid accounts of prepaid accounts 110. The example prepaid accounts 110 includes a primary prepaid account 202, and secondary prepaid accounts 204 and 206. Each secondary prepaid account corresponds to an amount to be paid to another user. For example, primary prepaid account 202 can have a value of $500, secondary prepaid account 204 can have a value of $200 and secondary prepaid account 206 can have a value of $300. The secondary prepaid account 204 can be used to purchase a first item of up to $300 and the secondary prepaid account 206 can be used to purchase a second item for up to $200. In other examples, a different number of secondary prepaid accounts can be used to make purchases. Each of the secondary prepaid accounts can be used to make purchases until the each secondary prepaid account is depleted.

Figure 3:
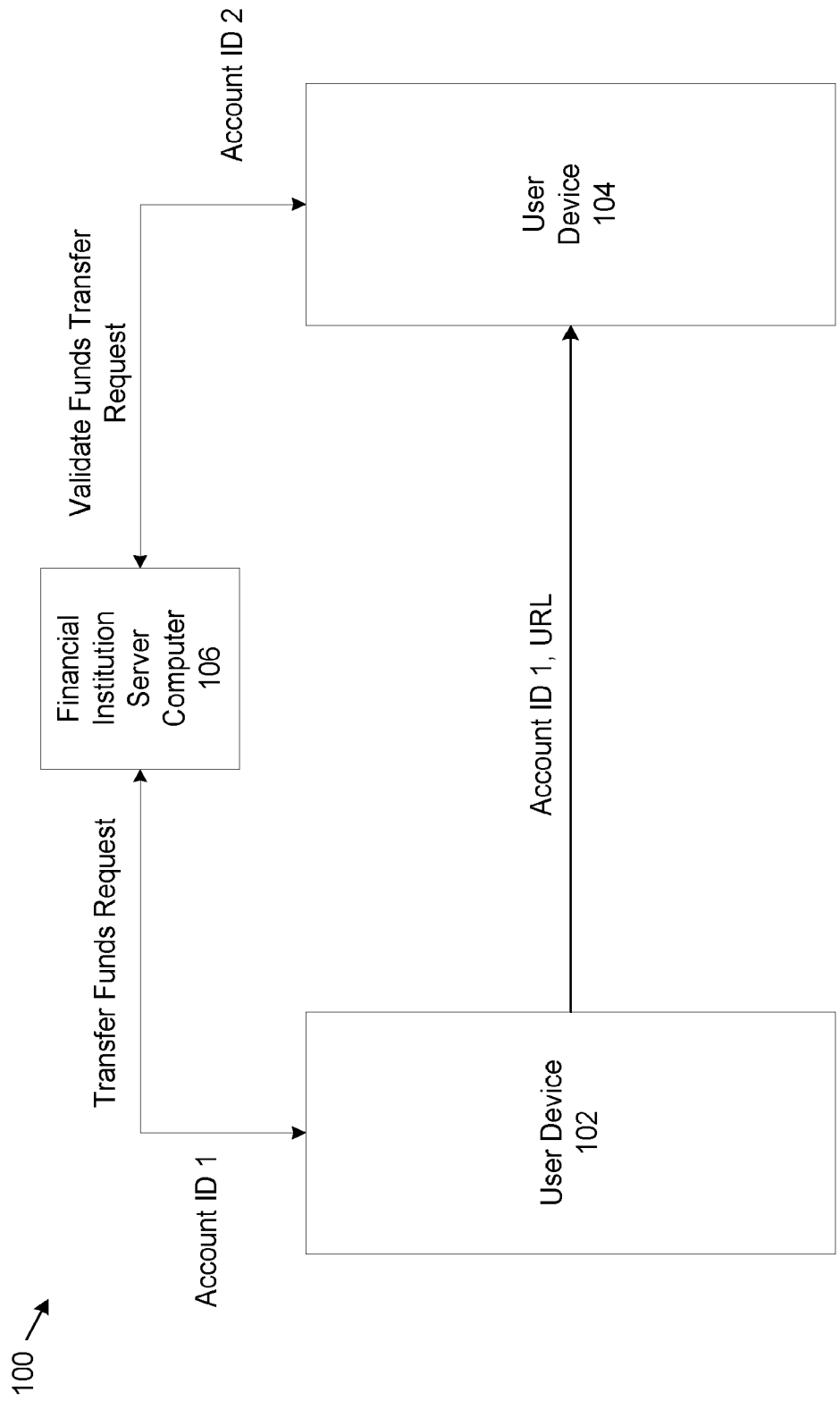
FIG. 3 shows another view of the example system of FIG. 1.

FIG. 3 shows another view of system 100. FIG. 3 shows that as a result of the transfer funds request from user device 102 to financial institution server computer 106, financial institution server computer 106 sends user device 102 account ID 1. As discussed earlier herein, account ID 1 comprises the token and the first transfer code. Account ID 1 identifies the secondary prepaid account to be transferred to user device 104.

User device 102 sends account ID 1 and the URL of the financial institution server computer 106 to user device 104. User device 104 sends a validate funds transfer request to financial institution server computer 106. After financial institution server computer 106 validates the transfer funds request, financial institution server computer 106 transfers ownership of the secondary prepaid account to user device 104 and sends account ID 2 to user device 104. As discussed earlier herein, account ID 2 comprises the token and the second transfer code, where the second transfer code is different that the first transfer code.

In some implementations, it may be possible to uniquely identify the secondary prepaid account at financial institution server computer 106 using just the transfer code. It these some implementations, the token is not transferred between user device 102 and user device 104 and is not sent to financial institution 106. Instead, the first transfer code and the URL are sent from user device 102 to user device 104, the first transfer code is sent from user device 104 to financial institution server computer 106 and the second transfer code is sent from financial institution server computer 106 to user device 104.

FIG. 4 shows example structures 400 of account ID 1 and account ID 2. The example structure 402 of account ID 1 includes a token and a transfer code. As shown in FIG. 4, the example token has a value of 143112 and the example transfer code has a value of 8431718. The example structure 404 of account ID 2 also includes a token and a transfer code. As shown in FIG. 4, the example token of account ID 2 has a value of 143112, the same value as the token of account ID 1. However, the example transfer code of account ID 2 has a value of 8431740, which is different than the transfer code of account ID 1. The financial institution server computer 106 generates a new transfer code for account ID 2 to signify that the user of user device 104 has now taken ownership of the funds transferred from the financial account of the user of user device 104.

Figure 5:
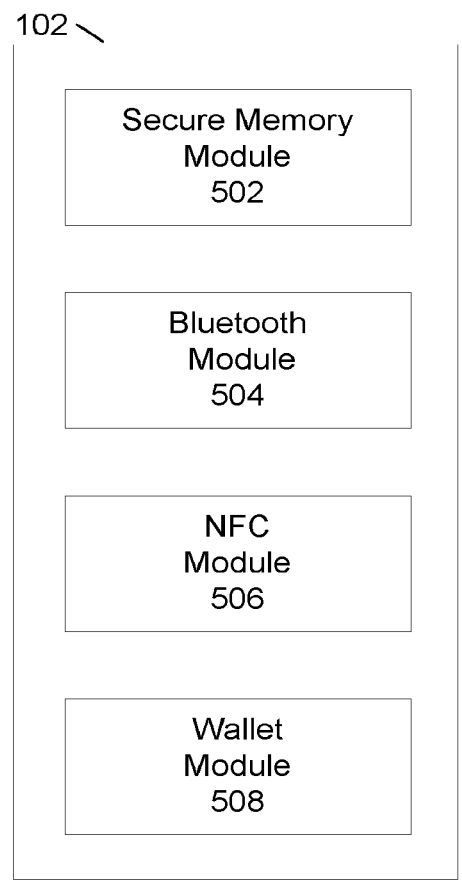
FIG. 5 shows example modules of a user device of the system of FIG. 1.

FIG. 5 shows example modules of user device 102. The modules include a secure memory module 502, a Bluetooth module 504, a near field communication (NFC) module 506 and a wallet module 508. More, fewer or different modules are possible. User device 104 includes similar modules.

The example secure memory module 502 provides a secure memory for storing prepaid payment amounts and associated account identifiers. In the implementation of system 100, the secure memory module 502 comprises a HCE/TEE system that includes a host card emulation service (the HCE) and a trusted execution environment (the TEE). The HCE is a software architecture that enables mobile applications the ability to offer payment card solutions independently of third parties. The TEE is a secure area of the main processor of a smartphone. The TEE ensures that code and data loaded within the TEE is protected, providing security features such as isolated execution, integrity of trusted applications and confidentiality of their assets. The account identifiers can be securely stored in the HCE secure environment. The TEE secure area grants wallet application 108 read/write privileges until a transfer of an account identifier occurs.

The example Bluetooth module 504 provides Bluetooth functionality for user device 102. The Bluetooth functionality includes the ability of user device 102 and user device 104 to communicate with each other along a short-range wireless connection. As discussed earlier herein, account identifier information is communicated between user device 102 and user device 104 via Bluetooth.

The example NFC module 506 provides near field communication capability between user device 102 and user device 104. In some implementations, NFC can be used to communicate the account identifiers between user device 102 and user device 104 instead of Bluetooth.

The example wallet module 508 implements a functionality of wallet application 108 for user device 102. A digital wallet is a software application implemented on user device 102 that permits an individual using user device 102 to conduct electronic commerce transactions. A generic payment application, such as a Visa or MasterCard pre-paid application is loaded onto user device 102. In some implementations, the pre-paid application is pre-loaded onto user device 102. As discussed earlier herein, once an account identifier for funds to be transferred to user device 102 is generated and sent to user device 104, a user on user device 104 has access to the funds.

Figure 6:
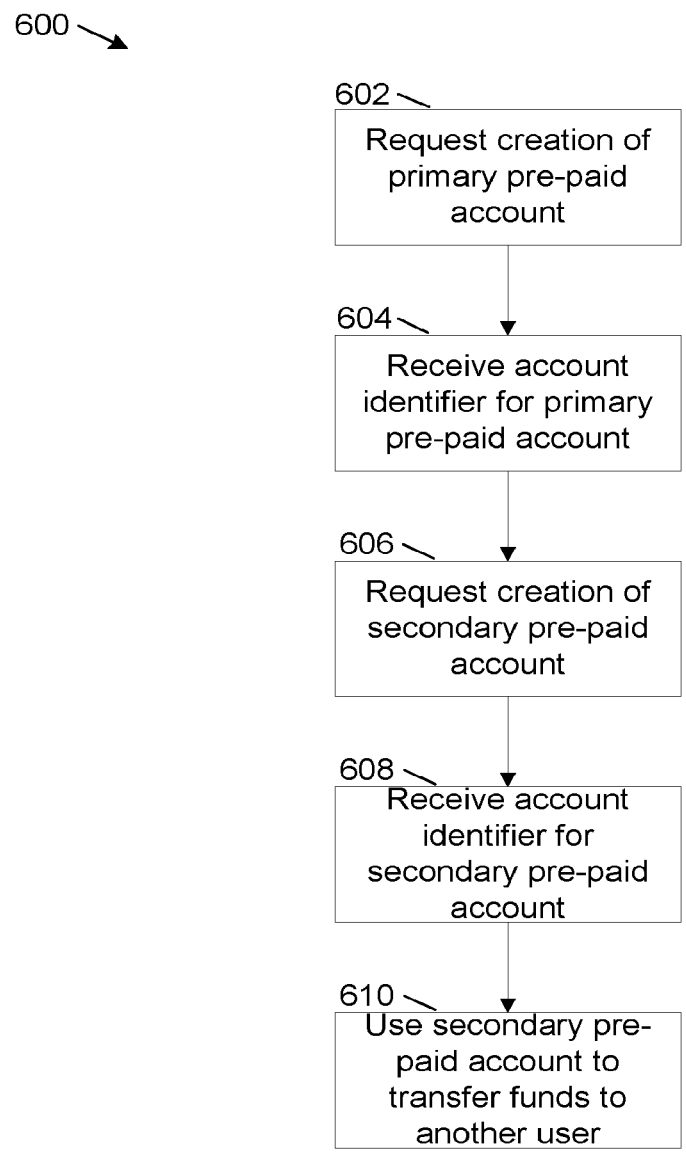
FIG. 6 shows a method for obtaining pre-paid accounts on the user device of the system of FIG. 1.

FIG. 6 shows a flowchart of an example method 600 for obtaining pre-paid accounts at a user device, such as user device 102. The method assumes that the user of user device 102 has one or more financial accounts at financial institution server computer 106.

At operation 602, the user of user device 102 sends a request to financial institution server computer 106 for creation of a primary pre-paid account for the user of user device 102. The request specifies an amount of the primary pre-paid account. As discussed earlier herein, the primary pre-paid account can be used to transfer funds to one or more other users via a creation of secondary pre-paid accounts.

At operation 604, the financial institution server computer 106 creates the primary pre-paid account for the user of user device 102 and sends an account identifier for the primary pre-paid account to user device 102. Funds for the primary pre-paid account are obtained from the one or more financial accounts for the user of user device 102 at the financial institution associated with financial institution server computer 106.

At operation 606, the user of user device 102 sends a request to financial institution server computer 106 to create a secondary pre-paid account for a specific dollar amount. Funds for the secondary pre-paid account are obtained from the primary pre-paid account, so the specific dollar amount is less than or equal to the dollar amount of the primary pre-paid account.

At operation 608, the financial institution server computer 106 creates the secondary pre-paid account and sends an account identifier for the secondary pre-paid account to user device 102.

At operation 610, the user of user device 102 uses the secondary pre-paid account to transfer funds to another user (for this method a user of user device 104), as explained next herein with respect to FIG. 7. The amount of the funds transferred is equal to the dollar amount of the secondary pre-paid account. As discussed earlier herein, a plurality of secondary pre-paid accounts can be created on user device 102 and used to transfer funds to a plurality of users. Each amount transferred to the plurality of users can be equal to an amount of the corresponding secondary pre-paid account used during the transfer.

Figure 7:
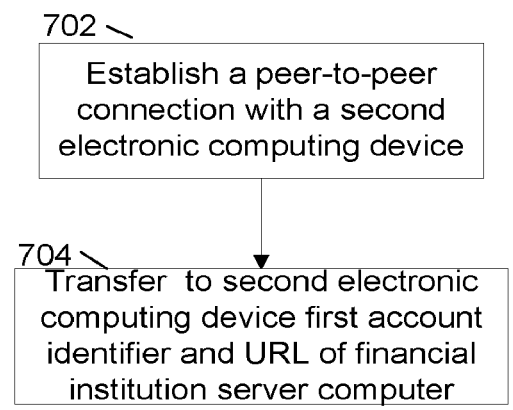
FIG. 7 shows a method implemented on a user device of the system of FIG. 1 for initiating a transfer of funds to another user device of the system of FIG. 1.

FIG. 7 shows a flowchart of an example method 700 for using the secondary pre-paid account of operation 608 to transfer funds to another user. For this method, the other user is the user of user device 104.

At operation 702, a peer-to-peer connection is established between user device 102 and user device 104. For method 700, the peer-to-peer connection is a Bluetooth connection.

At operation 704, user device 102 transfers to user device 104 a first account identifier corresponding to the secondary pre-paid account. User device 102 also transfers to user device 104 a URL of the financial institution server computer 106. As discussed earlier herein, the user of user device 104 does not need to have a financial account on financial institution server computer 106 in order to received funds transferred from user device 102.

Figure 8:
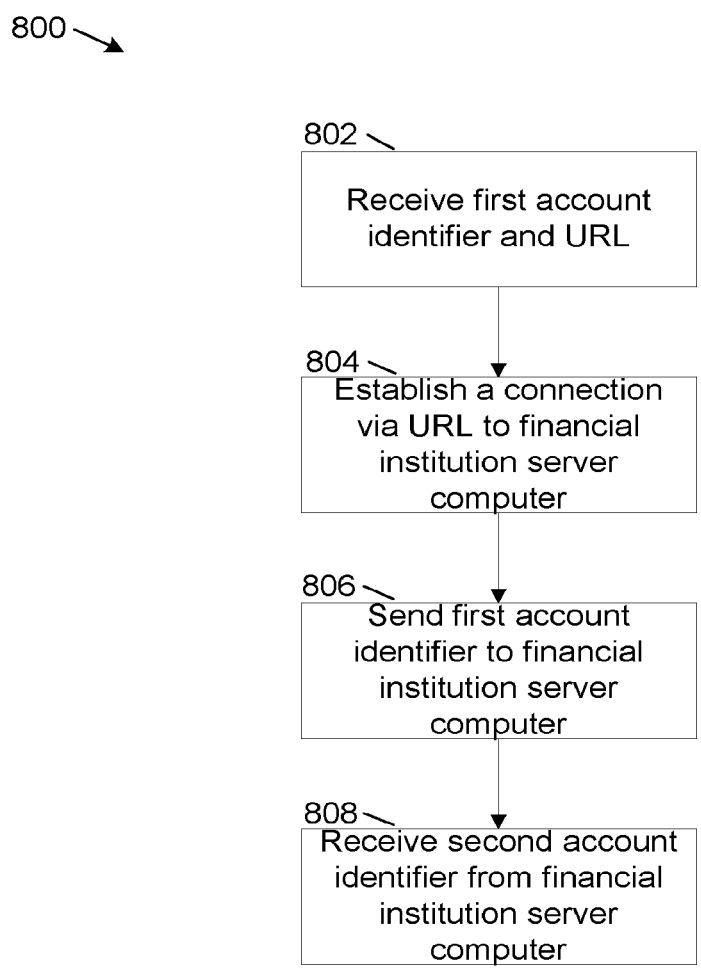
FIG. 8 shows a method implemented on a user device of the system of FIG. 1 for completing a funds transfer from another user device of the system of FIG. 1.

As discussed in more detail with respect to FIG. 8, when financial institution server computer 106 receives the first account identifier, financial institution server computer 106 transfers ownership of the secondary pre-paid account to user device 104. Financial institution server computer 106 then creates a second account identifier for the secondary pre-paid account and sends the second account identifier to the second electronic computing device. For this implementation, the token portion of the first account identifier and the second account identifier are the same but the transfer code for the first account identifier and the second account identifier are different.

FIG. 8 shows a flowchart of an example method 800 implemented on the user device 104 for completing a transfer of funds from the secondary pre-paid account of user device 102.

At operation 802, user device 104 receives from user device 102 the first account identifier for the secondary pre-paid account. User device 104 also receives the URL of financial institution server computer 106.

At operation 804, user device 104 establishes a connection to the URL of financial institution server computer 106.

At operation 806, user device 104 sends the first account identifier to financial institution server computer 106. Financial institution server computer 106 uses the first account identifier to identify the secondary pre-paid account associated with the first account identifier. Financial institution server computer 106 then creates the second account identifier and assigns the second account identifier to the secondary pre-paid account. When the second account identifier is created, ownership of the secondary pre-paid account is transferred from the user of user device 102 to the user of user device 104. As discussed earlier herein, for this implementation, the second account identifier has the same token as the first account identifier but with a different transfer code. When financial institution server computer 106 creates the second account identifier, the user at user device 104 has control of the secondary pre-paid account associated with the first account identifier. In addition, when financial institution server computer 106 creates the second account identifier, the user at user device 102 no longer has control of the secondary pre-paid account associated with the first account identifier.

At operation 808, user device 104 receives the second account identifier from financial institution server computer 106. When the user at user device 104 receives the second account identifier, the user at user device 104 can make purchases with funds in the secondary re-paid account.

Figure 9:
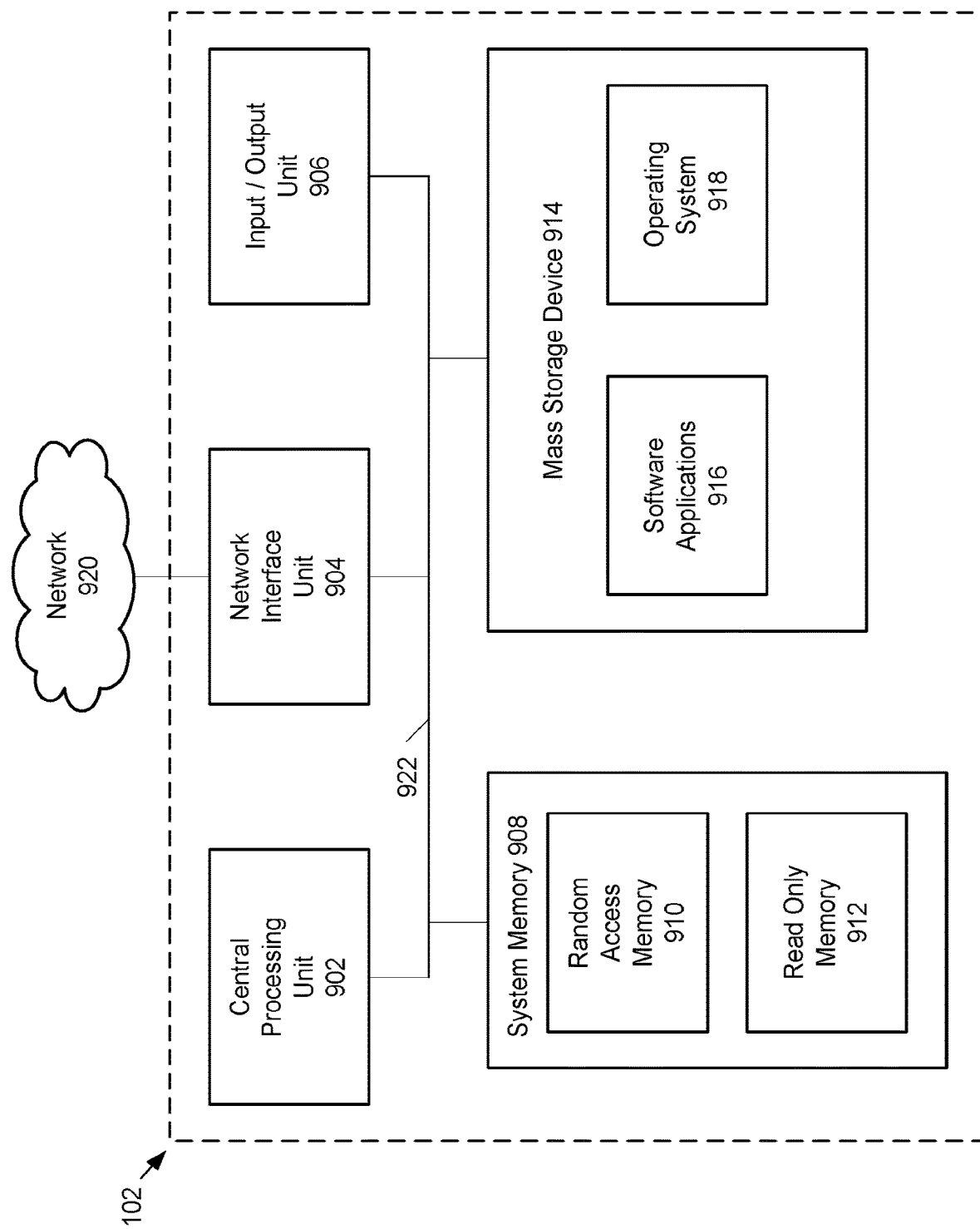
FIG. 9 shows example physical components of the user devices of the system of FIG. 1.

As illustrated in the example of FIG. 9, user device 102 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the user device 102, such as during startup, is stored in the ROM 912. The user device 102 further includes a mass storage device 914. The mass storage device 914 is able to store software instructions and data. Some or all of the components of the user device 102 can also be included in user device 104.

The mass storage device 914 is connected to the CPU 902 through a mass storage controller (not shown) connected to the system bus 922. The mass storage device 914 and its associated computer-readable data storage media provide non-volatile, non-transitory storage for the user device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the user device 102.

According to various embodiments of the invention, the user device 102 may operate in a networked environment using logical connections to remote network devices through the network 920, such as a wireless network, the Internet, or another type of network. The user device 102 may connect to the network 920 through a network interface unit 904 connected to the system bus 922. It should be appreciated that the network interface unit 904 may also be utilized to connect to other types of networks and remote computing systems. The user device 102 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the user device 102 can store software instructions and data. The software instructions include an operating system 918 suitable for controlling the operation of the user device 102. The mass storage device 914 and/or the RAM 910 also store software instructions, that when executed by the CPU 902, cause the user device 102 to provide the functionality of the user device 102 discussed in this document. For example, the mass storage device 914 and/or the RAM 910 can store software instructions that, when executed by the CPU 902, cause the user device 102 to display received data on the display screen of the user device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a first electronic computing device for receiving ownership of a monetary amount from a second electronic computing device, the method comprising:
    on the first electronic computing device, receiving a first account identifier and a uniform resource locator (URL) of a server computer of a financial institution from the second electronic computing device,
    wherein the second electronic computing device, in response to a request for transfer of a portion of funds from the server computer of the financial institution, receives the first account identifier from the server computer of the financial institution prior to sending the first account identifier to the first electronic computing device, and
    wherein the first account identifier is an identifier for the financial account at the financial institution from which the portion of funds having a value equal to the monetary amount can be obtained;
    sending, using the URL, the first account identifier to the server computer of the financial institution that has access to the financial account; and
    receiving a second account identifier from the server computer of the financial institution, the second account identifier being created by the server computer of the financial institution as an updated identifier for identifying the financial account at the financial institution upon receiving the first account identifier, a portion of the second account identifier being different than the first account identifier, and the second account identifier confirming a transfer of the ownership of the monetary amount to a first user of the first electronic computing device.

2. The method of claim 1, wherein the first account identifier is sent to the first electronic computing device using a peer-to-peer connection between the first electronic computing device and the second electronic computing device.

3. The method of claim 1, wherein the first account identifier is sent to the first electronic computing device using an Internet connection between the first electronic computing device and the second electronic computing device.

4. The method of claim 3, wherein the first account identifier and the second account identifier each include a first section that represents a token and a second section that represents a transfer code.

5. The method of claim 4, wherein the token of the first account identifier and the second account identifier are identical and wherein the transfer code of the first account identifier and the second account identifier are different.

6. The method of claim 5, wherein after receiving the second account identifier from the server computer of the financial institution, the first account identifier is no longer valid.

7. The method of claim 1, wherein the first account identifier comprises a first transfer code and the second account identifier comprises a second transfer code, the first transfer code being different from the second transfer code.

8. The method of claim 1, wherein the second account identifier permits a second user of the second electronic computing device to make purchases equal to or less than the monetary amount.

9. The method of claim 1, wherein the financial account is a pre-paid account for the monetary amount.

10. A first electronic computing device comprising:
    a processing unit; and
    system memory, the system memory including instructions which, when executed by the processing unit, cause the first electronic computing device to:
    receive a first account identifier and a uniform resource locator (URL) of a server computer of a financial institution from a second electronic computing device,
    wherein the second electronic computing device, in response to a request for transfer of a portion of funds from the server computer of the financial institution, receives the first account identifier from the server computer of the financial institution prior to sending the first account identifier to the first electronic computing device; and
    wherein, the first account identifier is an identifier for a financial account at the financial institution from which the portion of funds having a value equal to a monetary amount can be obtained;
    send, using the URL, the first account identifier to the server computer of the financial institution that has access to the financial account; and
    receive a second account identifier from the server computer of the financial institution, the second account identifier being created by the server computer of the financial institution as an updated identifier for identifying the financial account at the financial institution upon receiving the first account identifier, a portion of the second account identifier being different than the first account identifier, and the second account identifier confirming a transfer of ownership of the monetary amount to a first user of the first electronic computing device.

11. The device of claim 10, wherein the first account identifier is sent to the first electronic computing device using a peer-to-peer connection between the first electronic computing device and the second electronic computing device.

12. The device of claim 10, wherein the first account identifier is sent to the first electronic computing device using an Internet connection between the first electronic computing device and the second electronic computing device.

13. The device of claim 10, wherein the first account identifier and the second account identifier each include a first section that represents a token and a second section that represents a transfer code.

14. The device of claim 13, wherein the token of the first account identifier and the second account identifier are identical and wherein the transfer code of the first account identifier and the second account identifier are different.

15. The device of claim 14, wherein after receiving the second account identifier from the server computer of the financial institution, the first account identifier is no longer valid.

16. The device of claim 15, wherein the first account identifier comprises a first transfer code and the second account identifier comprises a second transfer code, the first transfer code being different from the second transfer code.

17. The device of claim 10, wherein the second account identifier permits a second user of the second electronic computing device to make purchases equal to or less than the monetary amount.

18. The device of claim 10, wherein the financial account is a pre-paid account for the monetary amount.

\* \* \* \* \*